United States Patent
Schalz et al.

(10) Patent No.: US 6,823,756 B2
(45) Date of Patent: Nov. 30, 2004

(54) DISPLACEMENT UNIT

(75) Inventors: Karl-Josef Schalz, Weilburg (DE); Norbert Gaul, Solms-Oberbiel (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 99 days.

(21) Appl. No.: 10/097,432

(22) Filed: Mar. 15, 2002

(65) Prior Publication Data

US 2002/0148313 A1 Oct. 17, 2002

(30) Foreign Application Priority Data

Mar. 16, 2001 (DE) .......................................... 101 12 706

(51) Int. Cl.[7] .............................................. F16H 1/18
(52) U.S. Cl. .............................. 74/424.96; 74/424.94; 74/424.37
(58) Field of Search ........................ 74/424.78, 424.94, 74/424.95, 424.96, 89.37, 89.38

(56) References Cited

U.S. PATENT DOCUMENTS

| | | | | |
|---|---|---|---|---|
| 2,393,764 A | * | 1/1946 | Frank ....................... | 74/424.95 |
| 3,136,920 A | | 6/1964 | Jensen | |
| 3,269,795 A | | 8/1966 | Floden | |
| 3,308,338 A | | 3/1967 | Seidler | |
| 3,654,816 A | * | 4/1972 | Beery et al. ............. | 74/424.75 |
| 3,678,286 A | | 7/1972 | Willis | |
| 3,832,539 A | | 8/1974 | Oram | |
| 4,110,820 A | | 8/1978 | Konoshima | |
| 4,274,294 A | * | 6/1981 | Siryj et al. ................ | 74/424.95 |
| 4,399,358 A | | 8/1983 | Burkhardt et al. | |
| 4,402,038 A | | 8/1983 | Hartung et al. | |
| 4,667,524 A | * | 5/1987 | Kozawa et al. .......... | 74/424.75 |
| 4,673,824 A | | 6/1987 | Pepper | |
| 4,716,776 A | * | 1/1988 | Sakaguchi ..................... | 74/28 |
| 4,751,398 A | | 6/1988 | Ertz, III | |
| 5,000,554 A | * | 3/1991 | Gibbs .......................... | 359/393 |
| 5,023,515 A | | 6/1991 | Olon et al. | |
| 5,032,962 A | | 7/1991 | Gehly et al. | |
| 5,078,021 A | * | 1/1992 | Freywiss ................... | 74/490.1 |

FOREIGN PATENT DOCUMENTS

| | | |
|---|---|---|
| CH | 495 530 | 10/1970 |
| DE | 14 89 516 | 9/1976 |

OTHER PUBLICATIONS

"Multi–Arm Cable Light Guide", Schott Brochure 10030d 11942.5 wo/gw.

* cited by examiner

*Primary Examiner*—David M. Fenstermacher
(74) *Attorney, Agent, or Firm*—Foley & Lardner LLP

(57) ABSTRACT

A displacement unit for at least one element to be displaced is provided comprising a drive unit, a transfer element that is caused to move by the drive unit and that comprises a thread or a tooth set, and an engagement element, which engages into the thread or tooth set of the transfer element and is thus driven by the motion of the transfer element, and by whose motion the displaced element is moved. The engagement element is configured elastically, in such a way that it deforms elastically upon contact by the displaced element against a stop or obstacle.

20 Claims, 1 Drawing Sheet

DISPLACEMENT UNIT

CROSS-REFERENCE TO RELATED PATENT APPLICATIONS

This invention claims the benefit and priority of German patent application 101 12 706.5-51 filed on Mar. 16, 2001, which is incorporated by reference herein in its entirety.

BACKGROUND OF THE INVENTION

I. Field of the Invention

The invention relates to a displacement unit for at least one element to be displaced (hereinafter "displaced element"), such as a carrier for optical elements, etc.

II. Background of the Invention

Displacement units of this kind are often used in precision engineering. In microscopy, for example, motorized displacement units are needed to move or pivot optical deflection prisms, optical subassemblies for focusing and/or focal length adjustment of objectives, dark slides, filters or other components of a microscope, or to switch them between different (and in particular between two) positions. For that purpose, known displacement units include a drive unit which drives a transfer element having a thread or a tooth set. An engagement element engages into the thread or tooth set in such a way that it is caused to move by motion of the transfer element. The motion of the transfer element then results in a motion of the displaced element.

In the case of many known displacement units, especially those in precision engineering or optics, the displacement or switchover must occur relatively quickly, and the positions to be arrived at must often be attained with high accuracy. In precision engineering and in optics, high-precision and therefore expensive components are used for this purpose. Above all, however, in the event of a malfunction such as, for example, contact by one or more parts of the unit against a stop, the displacement unit must not be damaged or "jam." Jamming is a substantial problem, since in this case the displacement unit cannot be put back into operation without complete disassembly.

Known displacement units therefore comprise electronic safety circuits which have sensors, limit value transducers, etc. which shut off the motor of the drive unit when the displaced element makes contact against a stop or an obstacle. Jamming of the displacement unit can nevertheless occur in the event of a malfunction of the sensors or the limit value transducers, or other electronic malfunctions, because parts of the displacement unit are in physical contact against the mechanical stop or the obstacle, such that the displacement unit necessarily jams as a result of the force of the motor that does not switch off due to the malfunction.

SUMMARY OF THE INVENTION

Thus, it is an object of the invention to develop a displacement unit such that in the event of contact against a stop or an obstacle, the displacement unit neither jams nor is otherwise damaged.

A manner of achieving this object according to the present invention is provided comprising a drive unit, a transfer element that is caused to move by the drive unit and that comprises a thread or a tooth set, and an engagement element, which engages into the thread or tooth set of the transfer element and is thus driven by the motion of the transfer element, and by means of whose motion the displaced element is moved. The engagement element is configured elastically, in such a way that it deforms elastically upon contact by the displaced element against a stop or obstacle;

A particularly preferred use of the invention is in a microscope, and in particular in an automated microscope.

An underlying idea of the invention is to prevent "jamming" of or other damage to a displacement unit, upon contact by the carrier (for example of optical elements) or by another part of the displacement unit against a stop or an obstacle, by means of an elastic configuration of the engagement element (i.e., to perform the safety function mechanically). To implement this idea according to one aspect of the present invention, the engagement element is configured elastically, in such a way that it deforms elastically upon contact by the displaced element against a stop or an obstacle. This configuration makes it possible to arrive against a stop with a deliberate "overrun" of the motor, so that the displacement unit is pushed gently against the stop and is thus accurately positioned.

As a result of this configuration, jamming of or damage to parts of the displacement unit can be reliably prevented or reduced, even without an electronic safety system. It is of course nevertheless possible, although not necessary even in the context of stringent safety requirements, to additionally provide an electronic safety circuit.

It is also possible to configure the engagement element in such way that it lifts out of the thread or tooth set and drops into the next thread flute or tooth space. This embodiment reliably prevents damage to parts even if the motor continues to rotate. Unlike with the use of slip clutches, positioning accuracy is maintained with a displacement unit configured according to the present invention.

A basic idea of the present invention as described above is, of course, applicable to a wide variety of displacement units, such as those required in particular in precision engineering and in optical devices, for example microscopes, automated objectives, etc.

The displacement units can move the carriers rotationally or translationally. In the case of a rotational motion, the transfer element can be, for example, a toothed rack. Instead of a gear, according to the present invention it is also possible to use a "star" whose individual "rays" are constituted by elastic rods or spring wires, each of which is the engagement element in the tooth set of the toothed rack and, upon contact by the carrier against a stop, is lifted out of the tooth set and then dropped into the next tooth space of the toothed rack.

It is particularly preferred, however, to use the basic idea of the present invention in displacement units in which the carrier is shifted translationally. In this case, the transfer element can be a threaded spindle and the displaced element a carriage. The engagement element preferably comprises at least one spring wire or spring rod whose one end is mounted on the carriage and whose other end resiliently engages into a thread flute of the threaded spindle. Particularly dependable shifting of the carriage is obtained if the engagement element comprises two or more spring wires or spring rods, preferably parallel to one another. The greater the number of spring wires or spring rods, the less play exhibited by the displacement unit. It is also preferred that the orientation of the spring wire or wires or spring rod or rods in the "undeformed" state is matched to the pitch of the threaded spindle.

Regardless of whether the carrier performs a translational or a rotational motion, it is further preferred that the drive unit comprises a controllable motor, and in particular an electric motor. Since the principle according to the present invention does not require such precise control of the motor as in the case of conventional displacement units, however, it is also possible to use other motors such as, for example, compressed-air motors.

It is particularly advantageous, however, that the present invention makes it possible, in the context of a displacement between only two positions, to "drive" the carrier, even without electronic safety systems, against stops whose location defines the respective position. Motor control can then be accomplished by way of a "time controller" that shuts off the motor after a specific time. In conventional displacement units, such a procedure would almost inevitably result in "jamming" of parts of the displacement unit or—if the activation time were too short—possibly in incorrect positioning.

If more than two positions are to be arrived at by the carrier or carriage, or if the carrier or carriage is to be continuously displaced, it is advantageous if at least one position sensor, whose output signal is applied to the drive unit as the "actual" signal for the position of the carrier, is provided. This embodiment allows highly precise control of the respective position desired. A position sensor of this kind can be, for example, an incremental displacement sensor.

The displacement unit according to the present invention can of course be used in a wide variety of devices. It is particularly preferred for use in a microscope, however, and in particular in an automated microscope, since it permits the various functions and displacements that are required in an automated microscope to be performed economically and with little installation outlay.

BRIEF DESCRIPTION OF THE DRAWINGS

The invention will be described in more detail below, referring to the drawings in which.

DETAILED DESCRIPTION OF THE INVENTION

Reference will now be made in detail to presently preferred embodiments of the invention. Wherever possible, the same reference numbers will be used throughout the drawings to refer to the same or like parts.

Figure 1:
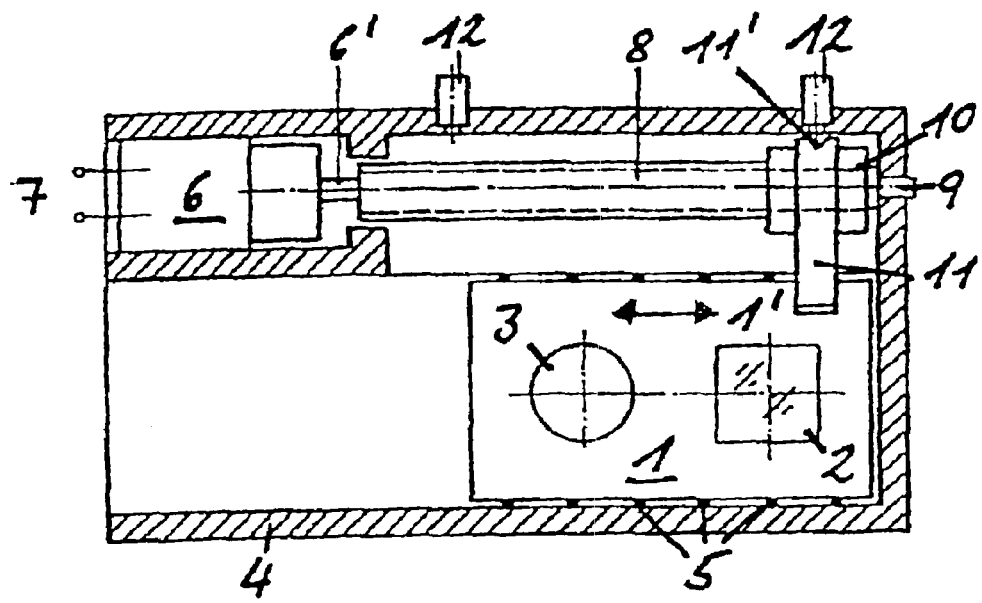
FIG. 1 Shows the construction of a displacement unit which will be used to explain an embodiment of the present invention.

FIG. 1 shows a displacement unit that shifts a carrier 1 translationally in the direction of double arrow 1'. Arranged on carrier 1 are optical elements, for example a deflection prism 2 and a further element 3. For that purpose, carrier 1 is mounted in linearly displaceable fashion in a housing 4 by means of balls 5.

The displacement unit comprises a reversible electric motor 6 having terminals 7, and a control unit (not depicted) provided for electric motor 6. Output shaft 6' of electric motor 6 is joined to one end of a threaded spindle 8, whose other end is mounted by means of a bearing 9 in housing 4. Arranged on threaded spindle 8 is a nut 10 on which guides 11 immovably joined to carriage 1 engage. As a result of a rotation of output shaft 6' of electric motor 6 and the rotation of threaded spindle 8 generated thereby, carriage 1 is thus shifted in the direction of double arrow 1' (depending on the direction of rotation).

The displacement unit depicted in FIG. 1 can be problematic in that the unit "jams" if carriage 1 makes contact against a wall of housing 4 and motor 6 continues to drive threaded spindle 8. Sensors 12, which ensure by way of the control unit (not depicted) that motor 6 shuts off when carriage 1 has reached the respective end position, are therefore provided in the displacement unit. For that purpose, guides 11 comprise grooves 11' that are sensed by sensors 12, which are preferably configured as optical sensors.

As long as sensors 12 and the control unit (not depicted) are functioning, no problems occur with the displacement unit depicted in FIG. 1. If one of sensors 12 and/or the control unit fails, however, motor 6 continues to turn threaded spindle 8 even if carriage 1 is in contact against a wall of housing 4. In such a case, nut 10 "jams" on threaded spindle 8.

Figure 2:
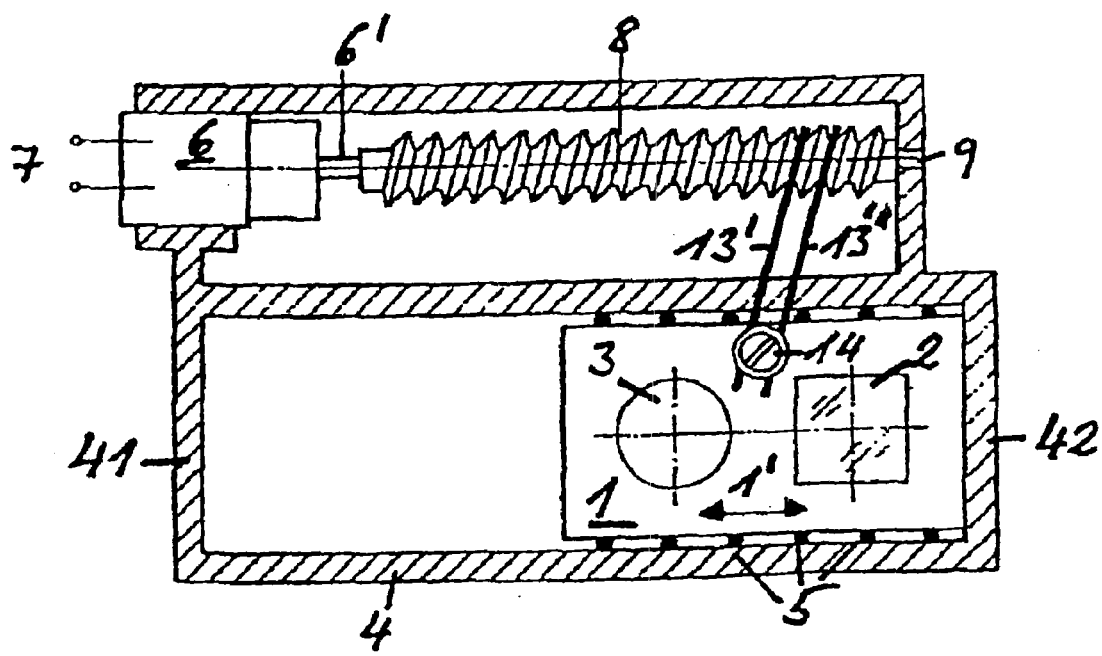
FIG. 2 Shows the construction of a displacement unit for translational motions of the carrier according to an embodiment of the present invention.

In the exemplary embodiment of FIG. 2, the effective connection between threaded spindle 8 and carriage 1 is created not via a nut 10 and guides 11, immovably joined to carriage 1, that engage on nut 10, but rather by way of two spring wires 13' and 13" (generally referred to as spring wires 13). Spring wires 13 are clamped by means of a screw 14 onto carriage 1. The free ends of spring wires 13 each engage into a flute of threaded spindle 8. Spring wires 13 are oriented in such a way that in the "undeformed" state they lie in the respective thread flute (i.e., their slope relative to the long side of carriage 1 corresponds to the pitch of threaded spindle 8). Due to this configuration, a rotation of threaded spindle 8 first causes carriage 1 to be displaced in the direction of double arrow 1' (i.e., to the left or right in FIG. 2). If the carriage comes into contact against the left or right side 41 or 42 of housing 4 and threaded spindle 8 continues to rotate because of the rotation of motor 6, spring wires 13' and 13" are elastically deformed. It is thus possible to adjust the motor in such a way that the carriage runs onto the stop and makes contact against it with a specific preload.

If the motor is not shut off after the carriage makes contact against the stop, spring wires 13' and 13" elastically deform and lift out of the thread flute in which they are presently located, and drop down into the next thread flute of threaded spindle or threaded rod 8. This process can repeat any number of times without resulting in damage to carriage 1 or jamming of a part of the displacement unit according to the present invention. An electronic safety circuit or the like for motor 6 can thus be dispensed with. In particular, it is possible to arrive at the two positions defined by housing walls 41 and 42 (which act as stops) by activating motor 6 for a specific time in a specific rotation direction.

This embodiment has the further critical advantage that the requirements in terms of the accuracy of threaded spindle 8 and the alignment of the individual parts relative to one another are less than in conventional devices.

Control by way of displacement sensors, etc., or position sensors that define specific positions, is nevertheless of course also possible.

Many modifications and variations may be made to the techniques and structures described and illustrated herein without departing from the spirit and scope of the invention. Accordingly, it should be understood that the methods and apparatus described herein are illustrative only and are not limiting upon the scope of the invention. In particular, the invention is not limited to the use of displacement units that move one or more parts translationally. Movement of the parts can also be accomplished rotationally or along tracks of any desired curvature.

What is claimed is:

1. A displacement unit for displacing a displacement element in a linear direction, comprising:

a drive unit;

a transfer element that is caused to move by the drive unit, said transfer element comprising at least one of a thread set and a tooth set; and an engagement element which engages said at least one of a thread set and a tooth set and is thus driven by motion of the transfer element, said engagement element moving said displacement element when driven, wherein the engagement element is configured elastically such that it deforms elastically and in said linear direction upon contact by said displacement element against a stop or obstacle.

2. The displacement unit as defined in claim 1, wherein the transfer element is a threaded spindle and the displacement element is a carriage.

3. The displacement unit as defined in claim 2, wherein an end of said engagement element engages with zero play into a thread flute of said threaded spindle.

4. The displacement unit as defined in claim 1, wherein upon contact by the displacement element against said stop or obstacle, the engagement element lifts out of the at least one of a thread set and a tooth set and drops into one of a next thread flute and a next tooth space, respectively, if the drive unit is not shut off.

5. The displacement unit as defined in claim 1, further comprising a module containing at least one of mechanical, optical, and electronic components, at least one of said components being movable into and out of a working position via one of a translational motion and a rotational motion.

6. A displacement unit for displacing a displacement element, comprising:

a drive unit;

a transfer element that is caused to move by the drive unit, said transfer element comprising at least one of a thread set and a tooth set; and an engagement element which engages said at least one of a thread set and a tooth set and is thus driven by motion of the transfer element, said engagement element moving said displacement element when driven, wherein the engagement element is configured lastically such that it deforms elastically upon contact by said displacement element against a stop or obstacle, further comprising a microscope mounting portion for mounting to an automated microscope.

7. The displacement unit as defined in claim 1, wherein the drive unit comprises a reversible motor.

8. The displacement unit as defined in claim 1, further comprising stops whose locations define respective positions of said displacement element.

9. The displacement unit as defined in claim 1, further comprising at least one position sensor whose output signal is applied to the drive unit, said output signal corresponding to a position of the displacement element.

10. The displacement unit as defined in claim 2, wherein the engagement element comprises one of at least one spring wire and at least one spring rod, and wherein a first end of said engagement element is mounted on the carriage and a second end of said engagement element resiliently engages said threaded spindle.

11. The displacement unit as defined in claim 10, wherein the engagement element comprises on of two spring wires and two spring rods.

12. The displacement unit as defined in claim 2, wherein an orientation of the engagement element is matched to a pitch of said threaded spindle.

13. A component positioning apparatus for positioning a component in a linear direction, comprising:

a motor;

a shaft engaging said motor, said shaft being moved by said motor; and an elastic member coupled to said shaft and coupled to said component in such a way as to move said component in response to movement of said shaft, wherein said elastic member elastically deforms in said linear direction when said component contacts an immovable object.

14. The component positioning apparatus of claim 13, wherein said shaft includes one of a threaded region and a toothed region, said elastic member being coupled to and moved by said one of a threaded region and a toothed region.

15. The component positioning apparatus of claim 14, wherein upon contact by said component with said immovable object, the elastic member lifts out of said one of said threaded region and said toothed region and drops into one of a next threaded flute and a next tooth space, respectively, if the motor is not shut off.

16. The component positioning apparatus of claim 13, wherein said shaft comprises a threaded spindle and said component comprises a carriage.

17. The component positioning apparatus of claim 14, wherein said elastic member comprises one of at least one spring wire and at least one spring rod, and wherein said elastic member has a first end mounted to said component and a second end resiliently engaging into a threaded flute of said threaded region.

18. A method of positioning a component in a linear direction, comprising the steps of:

translating a shaft having one of a threaded region and a toothed region;

moving a coupling member in response to send translating step, said coupling member having a first end located in said one of said threaded region and said toothed region and a second end coupled to said component;

moving said component in response to the step of moving a coupling member; and elastically deforming said coupling member in said linear direction when said component contacts an immovable object.

19. The method of claim 18, further comprising a step of lifting said first end out of said one of said threaded region and said toothed region and into a next one of a threaded flute and a tooth space, respectively.

20. The method of claim 18, wherein the step of translating a shaft comprises rotating a threaded spindle.

* * * * *